United States Patent [19]
Law

[11] 3,875,145
[45] Apr. 1, 1975

[54] PURIFICATION OF TRIS[1-(2-METHYL) AZIRIDINYL]PHOSPHINE OXIDE

[75] Inventor: Ronald D. Law, Brigham City, Utah

[73] Assignee: Thiokol Corporation, Bristol, Pa.

[22] Filed: Jan. 14, 1974

[21] Appl. No.: 432,936

[52] U.S. Cl. .......................... 260/239 EP, 260/705
[51] Int. Cl. ............................................... C07f 9/56
[58] Field of Search .............................. 260/239 EP

[56] References Cited
UNITED STATES PATENTS
3,359,259   12/1967   Ham.............................. 260/239 EP Primary Examiner—Alton D. Rollins
Assistant Examiner—Mark L. Bench
Attorney, Agent, or Firm—Thomas W. Brennan

[57] ABSTRACT

Contaminants are removed from MAPO by dissolving impure MAPO in a solvent selected from benzene, chloroform, or mixtures of chloroform and carbon tetrachloride, extracting a portion of the MAPO from the solvent with water, extracting a portion of the MAPO from water with methylene chloride, and removing the methylene chloride from the MAPO.

8 Claims, No Drawings

PURIFICATION OF TRIS[1-(2-METHYL) AZIRIDINYL]PHOSPHINE OXIDE

BACKGROUND OF THE INVENTION

1. Field of the Invention

This invention pertains to a purification process for a phosphorus heterocyclic oxide, in particular, an extraction process for tris[1-(2-methyl)aziridinyl]phosphine oxide.

2. Description of the Prior Art

Tris[1-(2-methyl)aziridinyl]phosphine oxide, referred herein as MAPO, is a high boiling, thermally unstable, toxic, oily liquid, used to cross link polymers. It, however, has contaminants that cause cracking of the cross linked polymers, particularly, carboxyl terminated polymers used in propellants when its impurity level is greater than 0.3 wt percent for chlorine and 4.0 wt percent for other impurities. These cracks widen under thermal stress causing propellants to burn rapidly and unevenly which results in missile misfiring and failure. Removal of these contaminants from large batches as by vacuum distillation at 0.15 mm Hg and 90°–92°C is too expensive and hazardous for commercial application, for MAPO rapidly decomposes in the present of heat to toxic, flammable products.

The extractive process described herein overcomes these problems and is based on the discovery that water preferentially retains chlorine impurities, that organic solvents such as benzene, chloroform and mixtures of chloroform and carbon tetrachloride preferentially retain the other impurities, and that methylene chloride retains MAPO and is readily removed.

SUMMARY OF THE INVENTION

The process comprises the steps of dispersing contaminated tris 1-(2-methyl)aziridinyl phosphine oxide (MAPO) in a liquid organic solvent selected from benzene, chloroform and mixtures of chloroform and carbon tetrachloride, extracting a portion of MAPO from the solvent with the water, extracting a portion of MAPO from the water with methylene chloride, and removing the methylene chloride from the MAPO.

DESCRIPTION OF THE PREFERRED EMBODIMENTS

The purification process is an extractive process based on the discovery that water preferentially retains the chlorine impurities, that benzene, chloroform, and mixtures of chloroform and carbon tetrachloride preferentially retain the other impurities, and that methylene chloride retains tris [1-(2-methyl)aziridinyl]phosphine oxide (MAPO) and is easily removed from MAPO. The process comprises the essential steps of dispersing the contaminated MAPO in a liquid organic solvent selected from benzene, chloroform, and mixtures of chloroform and carbon tetrachloride, extracting a portion of the MAPO from the liquid organic solvent with water, extracting a portion of the MAPO from the water with methylene chloride, and removing the methylene chloride from the MAPO.

The term extracting and the various extractive processes are used as described by Lyman C. Craig and David Craig, *Laboratory Extraction and Countercurrent Distribution*, in *Technique of Organic Chemistry*, ed. by A. Weissberger, NY, Interscience Publishers, Inc., Vol. III, Part 1, 1956, p. 149–394. For example, the step of extracting a portion of the MAPO from the liquid organic solvent with water essentially consists of contacting the organic phase with the water phase during which contact a portion of MAPO transfers across the boundary where the two phases meet, and a portion of the impurities also transfers, but the ratio of the amount of impurities to the MAPO retained by the organic phase is greater than the ratio for the water phase. The same phenomenon occurs at the point of contact between the water phase and the methylene chloride phase when extracting a portion of the MAPO from the water phase with methylene chloride except that the ratio of chlorine to MAPO is greater in the water phase than in the methylene chloride phase. Consequently, when these steps are combined in an extractive purification the MAPO in the methylene chloride phase has less impurities than the initial MAPO used.

The extractive process using this invention may be a discontinuous one, that is a single contact between the different phases is made, or a multiple discontinuous process, that is a multiple number of contacts are made between the phases, or a continuous extractive process, that is the phases flow counter current to each other. These different ways are described in the reference of L. Craig and D. Craig cited above.

The examples described below are based on a discontinuous extractive process and show that almost 50 percent of the impurities are removed. The imine assay is determined from quantitative reaction of thiocyanic acid with 2-methyl aziridine rings, which assay is significant to the nearest 0.1 percent.

EXAMPLE 1

100 grams of tris[1-(2-methyl)aziridinyl]phosphine oxide dispersed in 300 ml of chloroform was extracted with 300 ml of water in a separatory funnel, and the water phase extracted with two 600 ml portions of methylene chloride which were combined and evaporated off to about 300 ml by boiling on a hot plate. The remaining solvent was removed by evaporation in a rotating evaporator under vacuum for two hours at 50°C. The final traces of solvent were removed by bubbling dry nitrogen through the product for 2 hours at 70°C. The yield was 20 grams. Chemical analysis before and after purification gave the following results:

|  | Before | After | % of impurities removed |
|---|---|---|---|
| Imine Assay | 92.2% | 96.0% |  |
| Polymer Impurities | 7.8% | 4.0% | 49% |
| Total Chlorine | 0.58% | 0.30% | 48% |
| Hydrolyzable Chlorine | 0.47% | 0.25% | 47% |
| Moisture | 0.20% | 0.18% | 10% |

EXAMPLE 2

100 grams of tris[1-(2-methyl)aziridinyl]phosphine oxide dispersed in a mixture of 120 ml of carbon tetrachloride and 180 ml of chloroform was extracted in a separatory funnel with four 150 ml portions of water. The water extracts were combined and extracted with four 300 ml portions of methylene chloride. The methylene chloride extracts were combined and evaporated off to about 300 ml by boiling on a hot plate. The remaining solvent was removed by evaporation in a rotating evaporator under vacuum for 2 hours at 50°C. The final traces of solvent and moisture were removed by bubbling dry nitrogen through the product for 4 hours at 60°C. The yield was 59 grams. Chemical analysis before and after purification gave the following values:

|  | Before | After | % of impurities removed |
|---|---|---|---|
| Imine Assay | 92.2% | 96.1% |  |
| Polymer Impurities | 7.8% | 3.9% | 50% |
| Total Chlorine | 0.58% | 0.27% | 53% |
| Hydrolyzable Chlorine | 0.47% | 0.21% | 55% |
| Moisture | 0.20% | 0.13% | 35% |

EXAMPLE 3

100 grams of tris[1-(2-methyl)aziridinyl]phosphine oxide dispersed in 300 ml of benzene was extracted by a three layer benzene-water-methylene chloride extraction performed in a 2-liter beaker with 300 ml of water and 1,000 ml of methylene chloride. The methylene chloride layer was removed and evaporated off to about 300 ml and the remaining solvent removed by treatment on a rotating evaporator under vacuum for 2 hours at 50°C. The final traces of solvent and moisture were removed by bubbling dry nitrogen through the product. Chemical analysis before and after purification gave the following values:

|  | Before | After | % Impurities Removed |
|---|---|---|---|
| Imine Assay | 92.2% | 95.4% |  |
| Polymer Impurities | 7.8% | 4.6% | 41% |
| Total Chlorine | 0.58% | 0.42% | 38% |
| Hydrolyzable Chlorine | 0.47% | 0.35% | 25% |
| Moisture | 0.20% | 0.07% | 65% |

The invention as described is not to be limited only by these examples but by the claims as set forth below.

I claim:

1. A process for removing impurities from contaminated tris[1-(2-methyl)aziridinyl]phosphine oxide, which comprises:
    dispersing the contaminated tris[1-(2-methyl)aziridinyl]phosphine oxide in an organic solvent selected from the group consisting of benzene, chloroform, and mixtures of chloroform and carbontetrachloride,
    extracting a portion of the tris[1-(2-methyl)aziridinyl]phosphine oxide from the organic solvent with water,
    extracting a portion of the tris[1-(2-methyl)aziridinyl]phosphine oxide from the water with methylene chloride, and
    removing the methylene chloride from tris[1-(2-methyl)aziridinyl]phosphine oxide.

2. The process as described in claim 1, wherein the step of removing the methylene chloride comprises:
    evaporating off the methylene chloride until a trace amount remains mixed with the tris[1-(2-methyl)aziridinyl]phosphine oxide, and
    passing an inert gas through the tris[1-(2-methyl)aziridinyl]phosphine oxide until the trace amount of methylene chloride is removed.

3. The process as recited in claim 1 wherein the organic solvent is a mixture of chloroform and carbontetrachloride.

4. The process as recited in claim 3 wherein the step of removing the methylene chloride comprises:
    evaporating off the methylene chloride until a trace amount remains mixed with the tris[1-(2-methyl)aziridinyl]phosphine oxide, and
    passing an inert gas through the tris[1-(2-methyl)aziridinyl]phosphine oxide until the trace amount of methylene chloride is removed.

5. The process as recited in claim 1, wherein the organic solvent is benzene.

6. The process as recited in claim 5, wherein the steps of removing the methylene chloride comprises:
    evaporating off the methylene chloride until a trace amount remains mixed with the tris[1-(2-methyl)aziridinyl]phosphine oxide, and
    passing an inert gas through the tris[1-(2-methyl)aziridinyl]phosphine oxide until the trace amount of methylene chloride is removed.

7. The process as recited in claim 1, wherein the organic solvent is chloroform.

8. The process as recited in claim 7, wherein the step of removing methylene chloride comprises:
    evaporating off the methylene chloride until a trace amount remains mixed with the tris[1-(2-methyl)aziridinyl]phosphine oxide, and
    passing an inert gas through the tris[1-(2-methyl)aziridinyl]phosphine oxide until the trace amount of methylene chloride is removed.

* * * * *